(12) United States Patent
Sun et al.

(10) Patent No.: US 10,846,597 B2
(45) Date of Patent: Nov. 24, 2020

(54) METHODS AND SYSTEMS FOR PROCESSING SOFTWARE TRACES

(71) Applicant: Google LLC, Mountain View, CA (US)

(72) Inventors: Xinruo Sun, Beijing (CN); Tianpeng Jin, Beijing (CN)

(73) Assignee: Google LLC, Mountain View, CA (US)

( * ) Notice: Subject to any disclaimer, the term of this patent is extended or adjusted under 35 U.S.C. 154(b) by 60 days.

(21) Appl. No.: 15/947,666

(22) Filed: Apr. 6, 2018

(65) Prior Publication Data
US 2018/0225575 A1    Aug. 9, 2018

Related U.S. Application Data

(63) Continuation of application No. 15/005,777, filed on Jan. 25, 2016, now Pat. No. 9,940,579.

(51) Int. Cl.
*G06F 9/44* (2018.01)
*G06F 11/34* (2006.01)
(Continued)

(52) U.S. Cl.
CPC ........... *G06N 5/02* (2013.01); *G06F 11/3636* (2013.01); *G06F 8/75* (2013.01); *G06F 11/3409* (2013.01);
(Continued)

(58) Field of Classification Search
CPC ............. G06F 2201/865; G06F 11/302; G06F 11/3664; G06F 11/3476; G06F 11/3466;
(Continued)

(56) References Cited

U.S. PATENT DOCUMENTS 5,928,369 A    7/1999    Keyser
5,991,735 A    11/1999    Gerace
(Continued)

FOREIGN PATENT DOCUMENTS

CN    101582048    11/2009
CN    102262527    11/2011

OTHER PUBLICATIONS

Dang et al., ReBucket: A Method for Clustering Duplicate Crash Reports Based on Call Stack Similarity, 10 pages (Year: 2012).*
(Continued)

*Primary Examiner* — Thuy Dao
(74) *Attorney, Agent, or Firm* — Foley and Lardner LLP

(57) ABSTRACT

Systems and methods for analysis of execution patterns for applications executing on remote devices. In some implementations of the system, a knowledge base stores successful traces from a plurality of instances of an application and one or more computing processors in the system receive, via a network interface, call-stack information from an instance of the application executing on a remote device, call-stack information including periodic captures of an execution status for the instance of the application, and determine whether there is a similarity between the call-stack information received from the instance of the application and the stored plurality of successful traces. Responsive to determining a similarity, the computing processors add the remote device to a population of devices likely to execute the object and facilitate further actions specific to the device population.

19 Claims, 5 Drawing Sheets

(51) Int. Cl.
  *G06F 11/36* (2006.01)
  *G06F 11/30* (2006.01)
  *G06N 5/02* (2006.01)
  *G06F 8/75* (2018.01)
(52) U.S. Cl.
  CPC ...... *G06F 11/3466* (2013.01); *G06F 11/3688* (2013.01)
(58) Field of Classification Search
  CPC ............. G06F 11/3409; G06F 11/3419; G06F 11/3636; G06F 11/323; G06F 2201/88; G06F 11/3688; G06F 11/3612; G06F 2201/86; G06F 2209/508; G06F 11/865; G06F 8/75; G06F 12/0811; G06F 12/0846; G06F 2212/6046; H04L 41/0893; H04L 41/5019; H04L 41/5029; G06N 5/02
  See application file for complete search history.

(56) References Cited

U.S. PATENT DOCUMENTS

| | | | |
|---|---|---|---|
| 6,002,872 | A | 12/1999 | Alexander et al. |
| 6,282,701 | B1 | 8/2001 | Wygodny et al. |
| 6,651,243 | B1 | 11/2003 | Berry et al. |
| 6,751,789 | B1 | 6/2004 | Berry et al. |
| 6,857,120 | B1 | 2/2005 | Arnold et al. |
| 7,509,632 | B2 | 3/2009 | Boger |
| 8,185,880 | B2 | 5/2012 | Gupta et al. |
| 8,359,450 | B2* | 1/2013 | Crosby ............... G06F 11/3476 711/170 |
| 8,381,196 | B2* | 2/2013 | Warren ............... G06F 11/3471 717/133 |
| 8,453,027 | B2 | 5/2013 | Bartz et al. |
| 8,719,791 | B1 | 5/2014 | MacPherson et al. |
| 8,799,872 | B2 | 8/2014 | Levine |
| 9,021,448 | B1* | 4/2015 | Gagliardi ............. G06F 11/3636 717/130 |
| 9,274,919 | B2* | 3/2016 | Greifeneder ........ G06F 9/45504 |
| 2005/0210439 | A1 | 9/2005 | Dimpsey et al. |
| 2005/0210452 | A1 | 9/2005 | Dimpsey et al. |
| 2005/0210454 | A1 | 9/2005 | Dewitt et al. |
| 2006/0130001 | A1* | 6/2006 | Beuch ................. G06F 11/3466 717/130 |
| 2006/0218543 | A1* | 9/2006 | Boger ................. G06F 11/3612 717/157 |
| 2006/0235947 | A1* | 10/2006 | Gray ................... G06F 11/3612 709/218 |
| 2007/0038896 | A1 | 2/2007 | Champlin et al. |
| 2008/0052678 | A1* | 2/2008 | Chagoly ............. G06F 11/3466 717/124 |
| 2008/0126873 | A1 | 5/2008 | Cocker et al. |
| 2008/0127112 | A1 | 5/2008 | Kettley et al. |
| 2008/0282232 | A1* | 11/2008 | Cong ................. G06F 11/3404 717/127 |
| 2009/0328005 | A1 | 12/2009 | Miskelly |
| 2009/0328007 | A1 | 12/2009 | Chen et al. |
| 2010/0100774 | A1* | 4/2010 | Ding ................... G06F 11/3636 714/45 |
| 2010/0199266 | A1 | 8/2010 | Warren et al. |
| 2010/0332473 | A1 | 12/2010 | Brodsky et al. |
| 2010/0333071 | A1 | 12/2010 | Kuiper et al. |
| 2011/0066908 | A1 | 3/2011 | Bartz et al. |
| 2011/0126173 | A1 | 5/2011 | Tzoref et al. |
| 2011/0138365 | A1 | 6/2011 | Schmelter et al. |
| 2011/0154487 | A1 | 6/2011 | Nakayama et al. |
| 2011/0296442 | A1 | 12/2011 | Qi et al. |
| 2013/0227352 | A1* | 8/2013 | Kumarasamy ...... G06F 11/3072 714/47.1 |
| 2013/0339562 | A1 | 12/2013 | Greiner et al. |
| 2014/0196042 | A1* | 7/2014 | Nakata ................. G06F 9/4856 718/1 |
| 2014/0215444 | A1* | 7/2014 | Voccio ................ G06F 11/3636 717/128 |
| 2014/0237454 | A1 | 8/2014 | Delporte |
| 2014/0282431 | A1* | 9/2014 | Delio, Jr. ............ G06F 11/3466 717/130 |
| 2015/0058825 | A1* | 2/2015 | Madampath ........ G06F 11/3636 717/128 |
| 2015/0309915 | A1 | 10/2015 | Ajith Kumar et al. |

OTHER PUBLICATIONS

Kim et al., IntroPerf: transparent context-sensitive multi-layer performance inference using system stack traces, 13 pages (Year: 2014).*
Farah et al., "Trace comparison using a sequence alignment algorithm", WSPPD 2015, Aug. 2015, pp. 17-20; <http://inf.ufrgs.br/gppd/wsppd/2015/papers/footer/WSPPD_2015_paper_12.pdf>.
Han et al., "Performance Debugging in the Large via Mining Millions of Stack Traces", Jun. 2012 IEEE, pp. 145-155; <https://dl.acm.org/citation.cfm?id=2337241&CFID=1010142667&CFTOKEN=63671704>.
Hofer et al., "Lightweight Java Profiling with Partial Safepoints and Incremental Stack Tracing", ACM, ICPE'15, Jan. 2015, pp. 75-86; <https://dl.acm.org/citation.cfm?id=2688038&CFID=1010142667&CFTOKEN=63671704>.
International Preliminary Report on Patentability on PCT/CN2014/089468 dated May 4, 2017.
International Search Report and Written Opinion for PCT Appl. Ser. No. PCT/CN2014/089468 dated Oct. 24, 2014 (12 pages).
Jin, et al. "Web Usage Mining Based on Probabilistic Latent Semantic Analysis." KDD01904, August 2201325, 2004. 9 pages.
Ortiz-Cordova, et al. "Classifying Web Search Queries to Identify High Revenue Generating Customers." Journal of the American Society for Information Science and TechnologyJul. 14, 2012. pp. 1426-1441.
U.S. Notice of Allowance on U.S. Appl. No. 15/005,777 dated Dec. 7, 2017.
U.S. Office Action on U.S. Appl. No. 15/005,777 dated Mar. 10, 2017.
U.S. Office Action on U.S. Appl. No. 15/005,777 dated Sep. 11, 2017.
Yin, et al. "Activity Recognition via User-Trace Segmentation." ACM Transactions on Sensor Networks, vol. 4, No. 4, Article 19. Aug. 2008. 34 pages.
First Office Action for CN Appln. Ser. No. 201480082848.1 dated Dec. 20, 2019 (11 pages).
Yingnon Dang et al "ReBucket: A Method for Clustering Duplicate Crash Reports Based on Call Stack", Jun. 30, 2012, 10 pages.

* cited by examiner

METHODS AND SYSTEMS FOR PROCESSING SOFTWARE TRACES

CROSS-REFERENCE TO RELATED PATENT APPLICATIONS

This application is a Continuation of U.S. patent application Ser. No. 15/005777, filed Jan. 25, 2016, entitled "Methods and Systems for Automated Tagging Based on Software Executive Traces," which is a national phase of International Application Number PCT/CN2014/089468, filed Oct. 24, 2014, entitled "Methods and Systems for Automated Tagging Based on Software Execution Traces," all of which are incorporated herein by reference in their entireties.

BACKGROUND

Inexpensive software applications are available for a variety of computing platforms. In general, some types of software applications, when executed on a host device, interact with back-end servers remote from the host device. The back-end servers can, in some situations, exchange information with application instances via a network.

SUMMARY

In some aspects, the disclosure relates to a system that includes a knowledge base storing a collected plurality of successful traces from a plurality of instances of an application executing on a plurality of remote devices. The system includes a network interface and a computer processor configured to receive, via the network interface from a first instance of the application executing on a first remote device, one or more units of call-stack information, the call-stack information including periodic captures of an execution status for the first instance of the application; and to receive, from the first instance of the application, an indicator that the first instance of the application has executed an objective. The computer processor is configured to aggregate, responsive to receiving the indicator, the received units of call-stack information leading up to the executed objective as a successful trace and store the successful trace in the knowledge base. The computer processor is also configured to receive, from a second instance of the application executing on a second remote device, one or more units of call-stack information, the call-stack information including periodic captures of an execution status for the second instance of the application; determine a similarity between the call-stack information received from the second instance of the application and the plurality of successful traces; and add, responsive to determining the similarity, the second remote device to a population of devices likely to execute the object.

In some aspects, the disclosure relates to a method that includes receiving, from a first instance of an application executing on a first remote device, one or more units of call-stack information, the call-stack information including periodic captures of an execution status for the first instance of the application; and receiving, from the first instance of the application, an indicator that the first instance of the application has executed an objective. The method includes aggregating the received units of call-stack information leading up to the executed objective as a successful trace and collecting a plurality of successful traces from a plurality of instances of the application executing on a plurality of remote devices. The method further includes receiving, from a second instance of the application executing on a second remote device, one or more units of call-stack information, the call-stack information including periodic captures of an execution status for the second instance of the application; determining a similarity between the call-stack information received from the second instance of the application and the plurality of successful traces; and adding the second remote device to a population of devices likely to execute the object.

In some aspects, the disclosure relates to computer-readable media storing instructions that, when executed by a computing device including one or more computing processors, causes the computing device to receive, from a first instance of an application executing on a first remote device, one or more units of call-stack information, the call-stack information including periodic captures of an execution status for the first instance of the application, and to receive, from the first instance of the application, an indicator that the first instance of the application has executed an objective. The instructions further cause the computing device to aggregate the received units of call-stack information leading up to the executed objective as a successful trace and collecting a plurality of successful traces from a plurality of instances of the application executing on a plurality of remote devices. The instructions further cause the computing device to receive, from a second instance of the application executing on a second remote device, one or more units of call-stack information, the call-stack information including periodic captures of an execution status for the second instance of the application; determine a similarity between the call-stack information received from the second instance of the application and the plurality of successful traces; and add, the second remote device to a population of devices likely to execute the object responsive to an affirmative determination.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements

DETAILED DESCRIPTION

Inexpensive software applications are available for a variety of computing platforms. An application user may pay a small amount of money, or in some cases no money at all, to install an application on a user device and to run the application. Users may pay a small sum to unlock additional features of the application, or to upgrade to a premium version of the application. In some instances, the application presents content that is supplied by either the application creator or by a third-party. In some instances, the application is distributed in association with another product, e.g., as a marketing tie-in to an event or venue. Generally, some applications, sometimes referred to as "apps," communicate with one or more back-end servers to obtain updates, multi-party interactions, and additional content. The back-end servers may select content to be delivered to each application instance based on a variety of parameters. In some implementations, specific execution patterns for a particular instance of the application are used to help select the content. Some execution patterns may indicate an increased likelihood for execution of one or more particular events. If an execution pattern suggests that a particular application instance is likely to execute an objective event, content may be selected to help guide an application's user towards the objective. Objectives include, but are not limited to, user interaction with selected content, in-app purchases, and continued user engagement with the application. In one scenario, if an entertainment application (i.e., a game) repeatedly executes function calls from a difficult level in the game, the user of the application may be interested in hints on how to progress past the difficult level.

Figure 1:
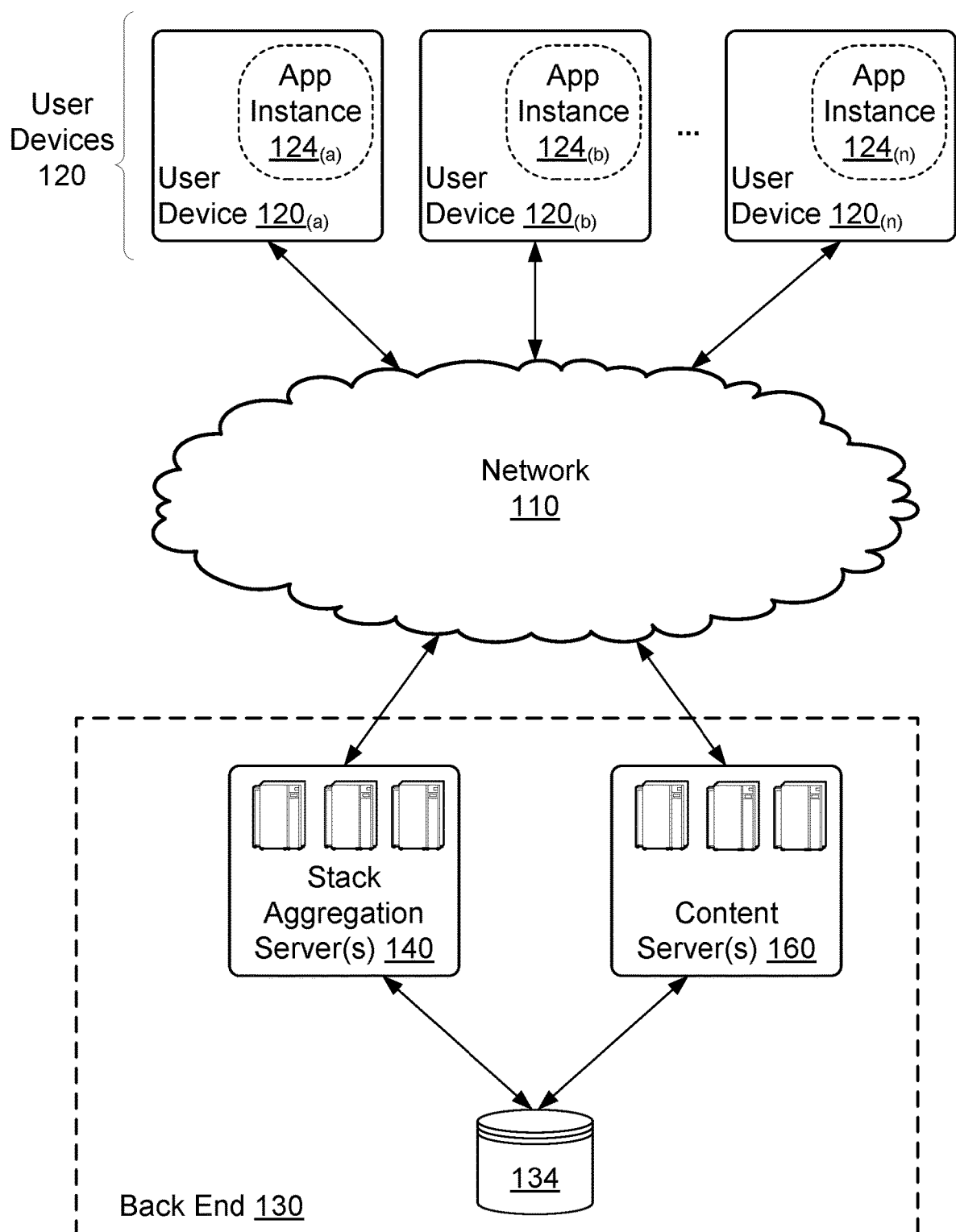
FIG. 1 is a schematic diagram of a network environment, according to an illustrative implementation.

Referring to FIG. 1 in broad overview, illustrated is a schematic diagram of a network environment. A network 110 enables communication between various user devices 120 and back-end servers 130. Each user device $120_{(a)}$-$120_{(n)}$ executes a respective instance $124_{(a)}$-$124_{(n)}$ of an application. The application instances $124_{(a)}$-$124_{(n)}$ (generally referred to as an instance 124) each transmit call-stack information to stack aggregation servers 140 via the network 110. The stack aggregation servers 140 store the received information in memory 134. The servers 140 identify execution patterns in the call stack information and designate a segment of the application instances 124 for receipt of special content based on the identified patterns. Content servers 160 provide content to the application instances 124. Application instances 124 in the designated segment receive, from the content servers 160, the special content selected for the segment.

In more detail, the network 110 conveys information between the user devices 120 and the back-end servers 130. The network 110 is composed of various network devices linked together to form one or more communication paths between participating devices. Each networked device includes at least one network interface for transmitting and receiving data, typically as one or more packets. The network interfaces link the networked devices to the network 110, and thus, through the network 110, to each other. An illustrative network 110 is the Internet; however, other networks may be used. The network 110 may be composed of multiple connected sub-networks. The network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The data links between devices in the network 110 may be any combination of wired links (e.g., fibre optic, cable, cat-5, etc.) and/or wireless links (e.g., radio, satellite, or microwave based). The network 110 may be public, private, or a combination of public and private networks. The network 110 may be any type and/or form of data network and/or communication network.

Figure 6:
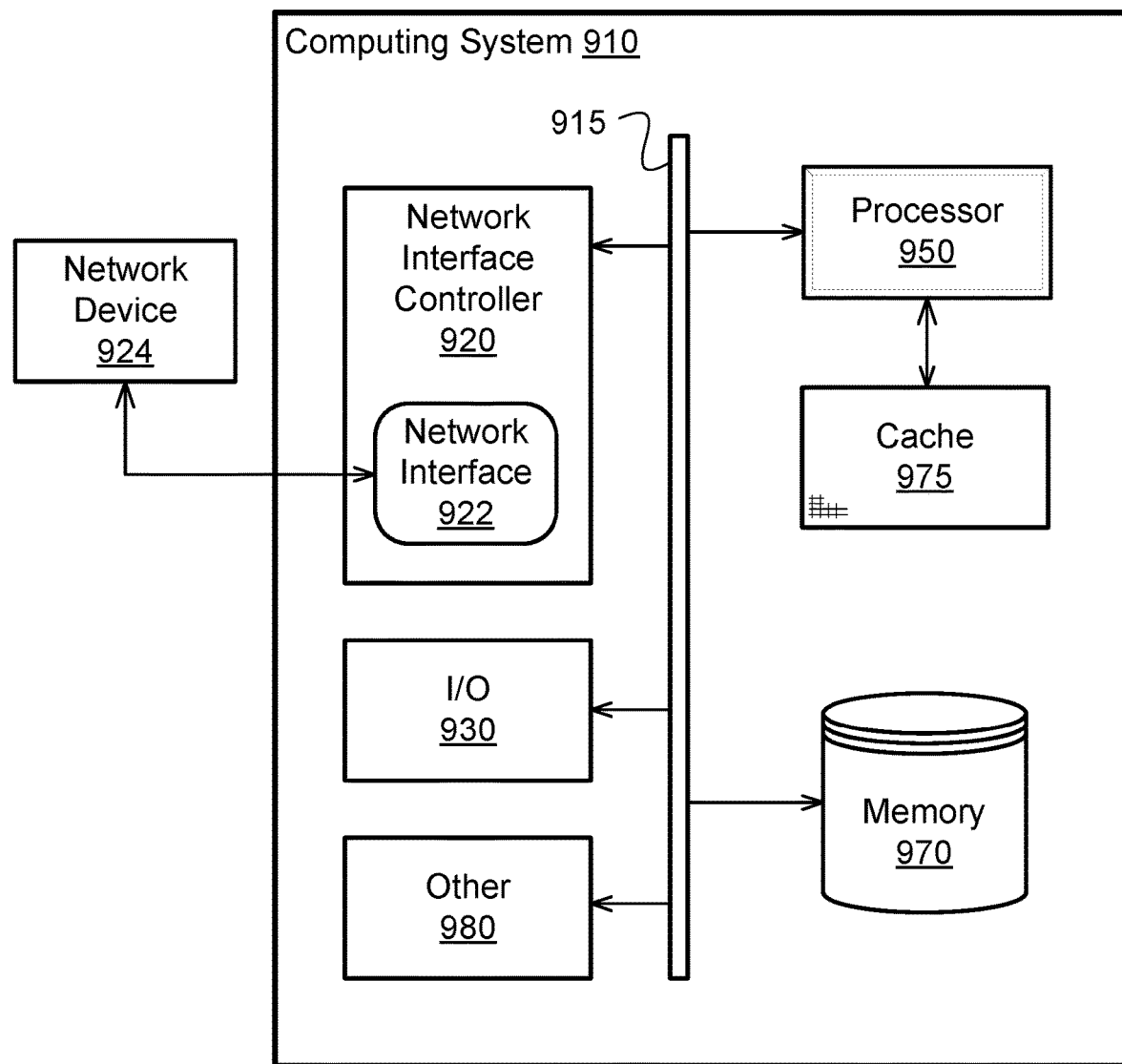
FIG. 6 is a block diagram of a computing system suitable for use in the various implementations described.

A user device 120 is capable of exchanging information via the network 110. A user device 120 may be any kind of computing device configured for user interaction. A user device 120 may be, but is not limited to, a laptop, desktop, tablet, electronic pad, personal digital assistant, smart phone, video game device, television, television auxiliary box (also known as a "set-top box"), kiosk, or portable computer. Generally, and without limitation, a user device 120 is capable of presenting content to a user or facilitating presentation of content to a user. A user device 120 typically runs an operating system that manages execution of software applications on the user device 120. In some implementations, the operating system is provided with the user device 120. The computing device described in reference to FIG. 6 is a computing device that, in some configurations, is suitable for use as a user device 120.

The back-end servers 130 includes stack aggregation servers 140 and content servers 160, described in more detail below. The back-end servers 130 may also include, in some implementations, other facilitative systems such as network devices functioning as routers or switches, data processing and filtering servers, data storage systems 134, application servers, and so forth. The back-end servers 130 may be housed in a single location or distributed across multiple locations connected by either the network 110 and/or by a secondary back-bone network. Some back-end servers 130 may be virtualized, i.e., a back-end server 130 may be hosted as a virtual machine on another computing device. In some instances, one or more virtual servers may be hosted by a third-party cloud services provider. Some back-end servers 130 may be implemented in custom hardware. Some back-end servers 130 may be generic computing devices configured with specific, non-generic, functionality. The computing device described in reference to FIG. 6 is a computing device that, in some configurations, is suitable for use as a back-end server 130.

The back-end 130 includes data storage 134, which may be any device, or collection of devices, suitable for storing computer readable data. Data storage 134 devices may be volatile or non-volatile storage, network attached storage, or storage area networks. Data storage 134 devices may incorporate one or more mass storage devices, which may be co-located or distributed. Devices suitable for storing data include all forms of non-volatile memory, media and memory devices, e.g., semiconductor memory devices such as EPROM, EEPROM, SDRAM, and Flash memory devices, magnetic disks, e.g., internal hard disks or removable disks, magneto optical disks, and CD ROM, DVD-ROM, and Blu-Ray® disc drives. Data storage devices may be virtualized. Data storage devices may be accessed via an intermediary server and/or via a network. Data storage devices may structure data as a collection of files, data blocks, or chunks. Some data storage devices may provide for error recovery using redundant storage and/or error recovery data (e.g., parity bits). The data storage 134 may host a database, e.g., a relational database. The data storage 134 may host a file storage system. Data stored in the data storage 134 may be structured as a knowledge base. The data may be stored in an encrypted form. Access to the data storage 134 may be restricted by one or more authentication systems.

A user may operate a user device 120 to remotely interact with various back-end servers 130 via the network 110. In some scenarios, a user may request one or more content items from a back-end server 130, e.g., a content server 160, using a client device 120. Responsive to requests received by the back-end server 130, requested content is delivered from one or more content servers 160 via the network 110 to the client device 120. The client device 120 then renders the received content for presentation to the user. A user may interact with the back-end servers 130 in this manner, such that a set of requests, responses, and subsequent requests may form a session. The user's session continues until the user stops requesting content items. In some implementations, the session is kept alive for a fixed period of time after delivery of the last content item, providing the user time to engage the content and make a subsequent request. In some implementations, content delivered to the client device 120 is configured to periodically make requests to a back-end server 130 to keep the session alive. In some implementations, a session is a logical grouping of requests from a client device 120 over a period of time.

In some implementations, each user device 120 has an identifier that may be used to distinguish between various user device instances. The identifier may be unique. In some implementations, an IP address is used as an identifier. In some implementations, a manufacturer or vendor assigns a user device 120 a permanent system identifier, such as a DUID, INID, IMSI, or MIN, recorded, e.g., in a SIM card, to be used as an identifier. In some implementations, a user supplies information used to identify a user device 120. In some implementations, an identifier is provided to a user device 120 and stored at the user device, e.g., as a cookie. When a user device 120 interacts with a back-end server 130, the user device 120 may provide the server 130 with the stored identifier. In some implementations, the identifier provided for storage at the user device 120 is an arbitrary or randomly selected number or character string. In some implementations, a back-end server 130 maintains a sequence number; for each first interaction with a user device 120, the server 130 sends the sequence number to the newly encountered user device 120 as an identifier and then increases the sequence number by some fixed or dynamic amount. In some implementations, the identifier provided for storage at the user device 120 is a function of the date and time of a first interaction between the user device 120 and the back-end server 130. In some implementations, each application instance 124 receives its own identifier that is not affiliated with identifiers used by other applications on the same host user device 120. In some implementations, the identifier provided for storage at the user device 120 has no meaning other than that it is uniquely assigned to a particular instance of a user device 120 (or application 124 executing on a user device 120) such that the identification in no way identifies, or is associated with, a user's personal identity, online or offline.

Figure 2:
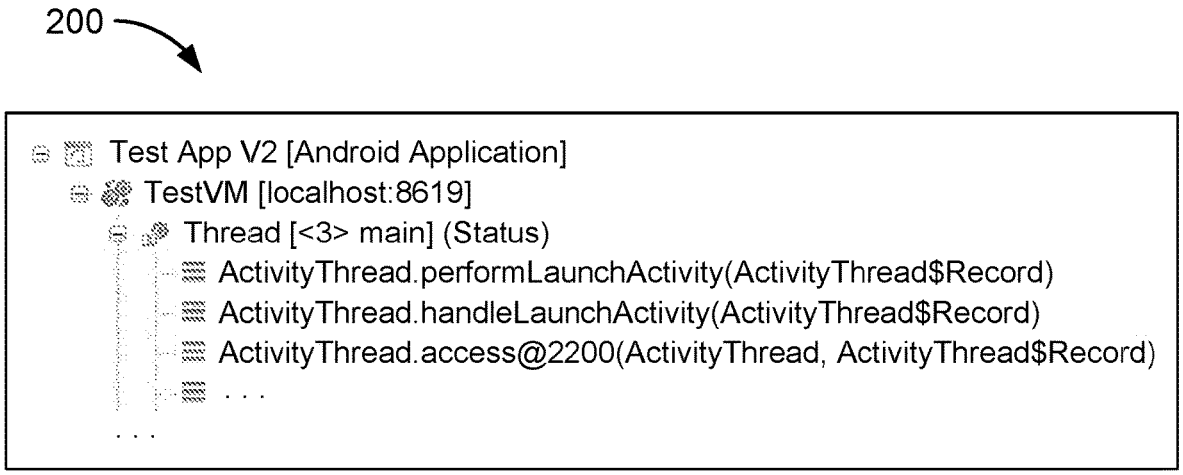
FIG. 2 is a call-stack visualization.
Figure 3:
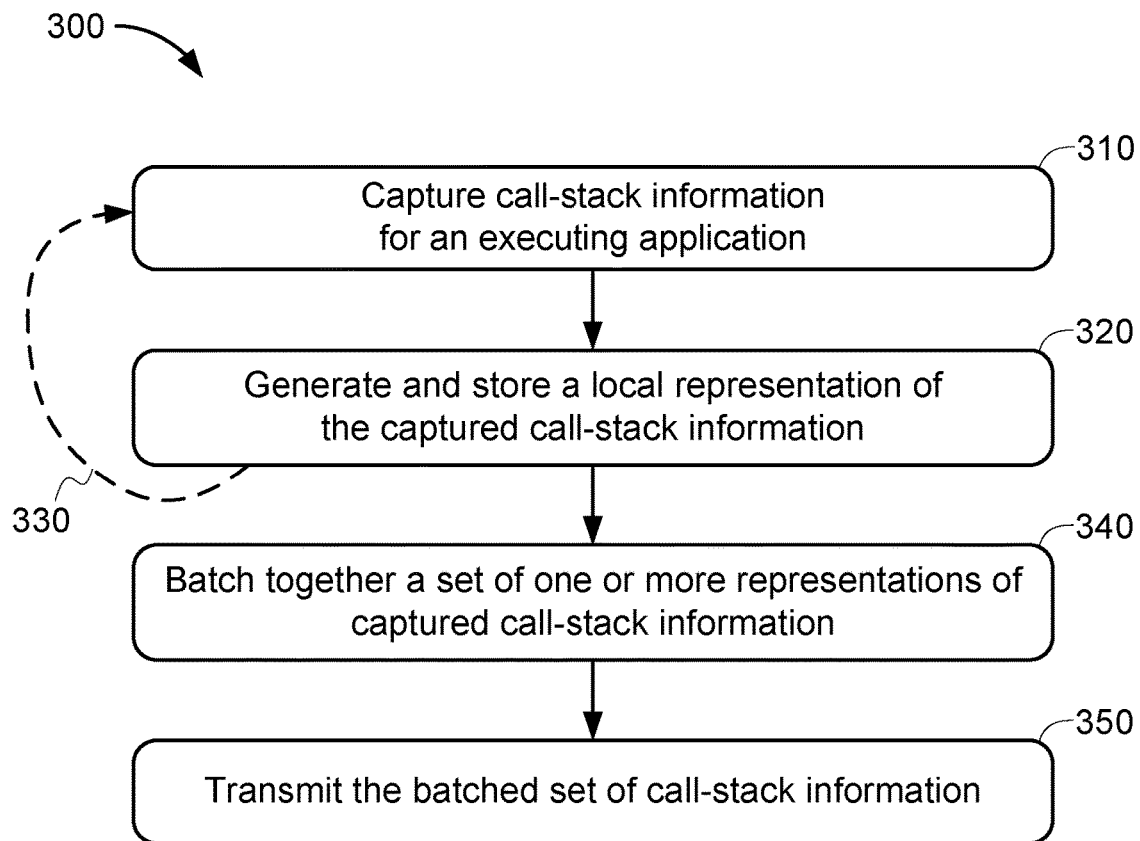
FIG. 3 is a flowchart depicting an implementation for a method of periodically capturing and transmitting call-stack information.

User devices 120 execute various software applications. In some implementations, one or more software applications are instrumented to periodically generate status information and to periodically transmit that status information to a back-end server 130. In some implementations, the status information is call-stack information for a specific application instance 124. In some implementations, the call-stack information is representative of a snapshot of an application's current execution status. Call-stack information is described in more detail in reference to FIG. 2, which is a representation of call-stack information. A specific application instance 124 may periodically generate status information by capturing call-stack information and transmit the status information to a back-end server 130. The transmitted information may be associated with an identifier for the application instance 124, but need not include any personal identifying information about the user. Transmission of call-stack information is described in more detail in reference to FIG. 3, which is a flowchart depicting an implementation for a method of periodically capturing and transmitting call-stack information. FIGS. 2 and 3 are described in more detail below. In some implementations, a user may select an option to disable transmission of the status information to the back-end server 130.

Figure 4:
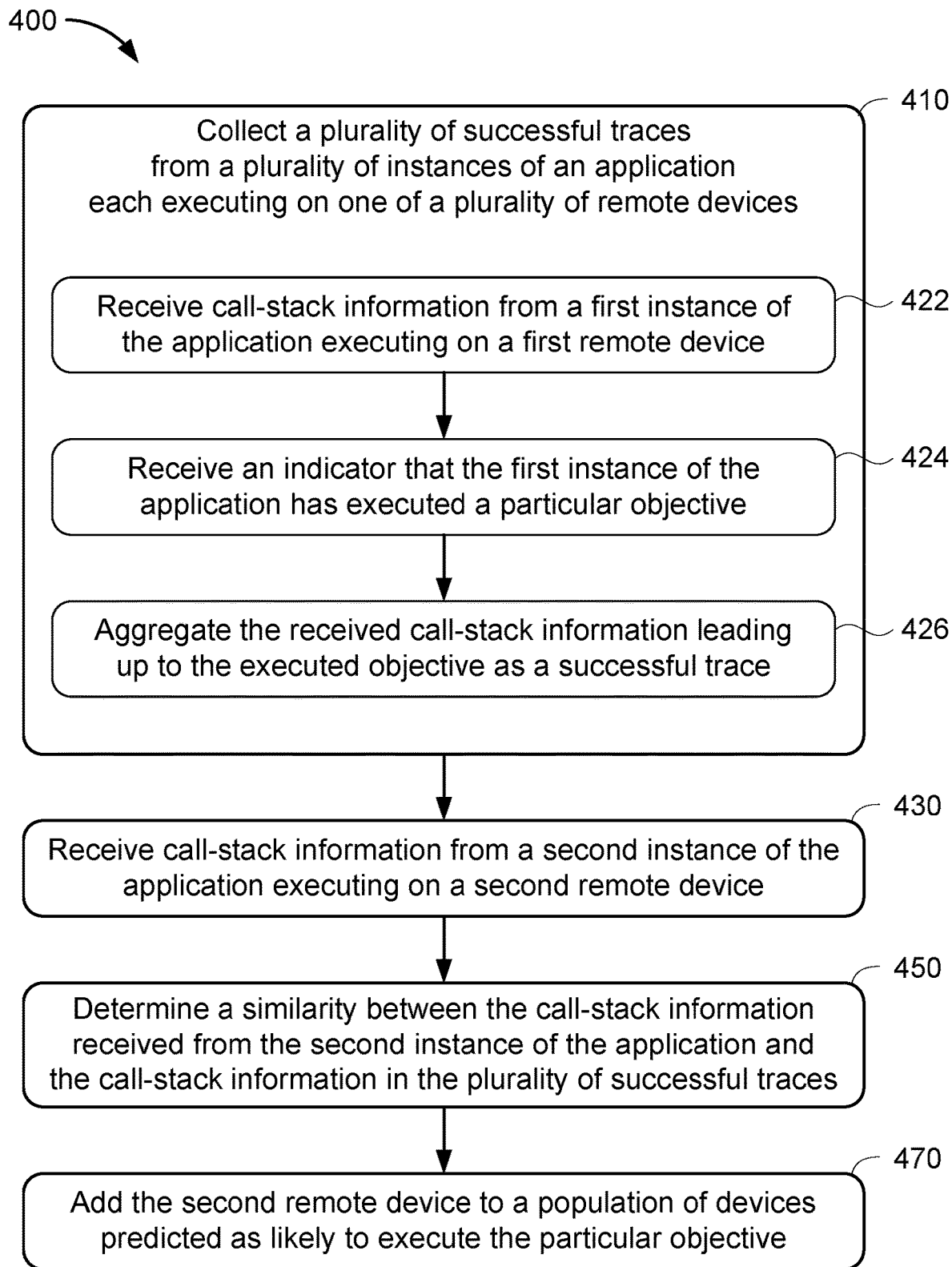
FIG. 4 is a flowchart depicting an implementation for a method of collecting and comparing call-stack information for a plurality of remote devices.

A stack aggregation server 140 is a back-end server 130 configured to receive call-stack information from the various user devices 120 via the network 110. In some implementations, the stack aggregation server 140 processes the call-stack information, e.g., filtering out some of the information based on a set of rules and/or identifying, from the call-stack information, whether the sending application instance 124 has executed a particular function or event. In some implementations, the stack aggregation server 140 records all or some of the received call-stack information in data storage 134. In some implementations, a stack aggregation server 140 works in conjunction with one or more additional stack aggregation servers 140. In some implementations, the multiple stack aggregation servers 140 access shared information storage, e.g., data storage 134. In some implementations, the stack aggregation server 140 compares received call-stack information to the stored call-stack information and identifies any similarities. FIG. 4, described below, is a flowchart depicting an implementation for a method of collecting and comparing call-stack information for a plurality of remote devices.

In general, the stack aggregation server 140 is configured to receive call-stack information from a user device 120 (e.g., user device $120_{(a)}$) and to compare the received call-stack information to aggregated call-stack information previously received from other user devices 120 (e.g., user devices $120_{(b)}$-$120_{(n)}$). More specifically, the aggregated call-stack information may be divided into two or more sub-groups (referred to as "segments") of the source user devices 120. In some implementations, the groups are divided based on similarities identified from the comparisons such that a user device 120 can be considered part of one segment or another segment, dependent on similarities between call-stack information received by the stack aggregation server 140 from the various user devices 120. In some implementations, the groups are divided based on additional factors. In some such implementations, the additional factors include whether an application instance completed other objectives, such as reaching a particular game level or completing an in-app purchase. In some implementations, segments are generated by applying a clustering algorithm to the received call-stack information, e.g., a hierarchical clustering algorithm.

Figure 5:
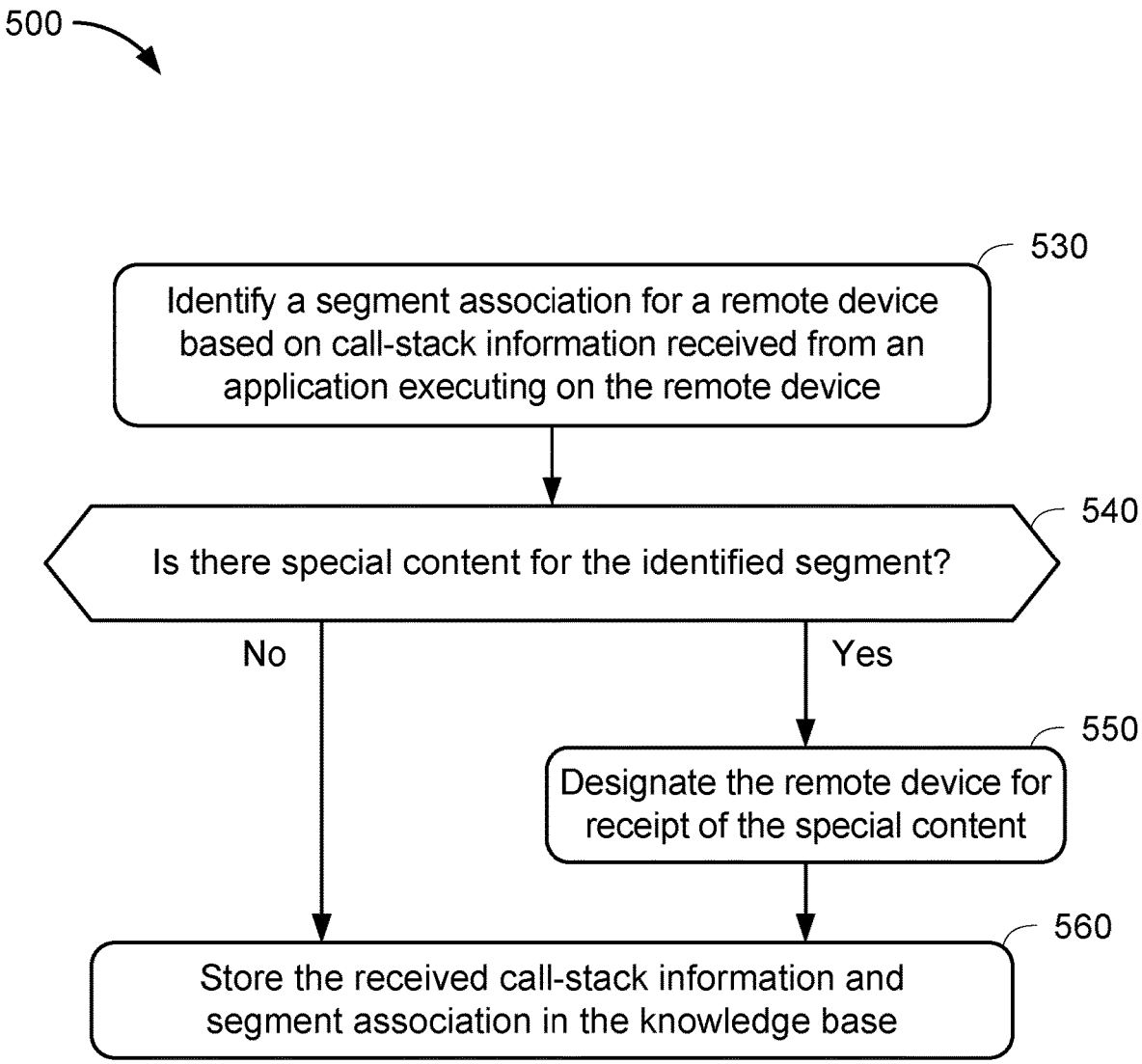
FIG. 5 is a flowchart depicting an implementation for a method of responding to identification of a segment association for received call-stack information.

In some implementations, the call-stack information is specific to the application, such that only user devices 120 executing an instance 124 of the application will submit call-stack information for the comparisons. If there is a special action reserved for user devices 120 in a particular segment, the stack aggregation server 140 or another back-end server 130 such as a content server 160, can carry out the special action responsive to determining that the user device 120 belongs to the particular segment. In some implementations, special content may be delivered to a user device that falls into a particular segment. In some implementations, a multi-level game application may determine that users who repeatedly call certain functions at a particularly difficult level might benefit from a hint as to how to progress to the next level; and responsive to this determination, the users' application instances may receive a special message containing the hint, or inviting the recipient to purchase the hint. FIG. 5, described below, is a flowchart depicting an implementation for a method of receiving call-stack information, identifying any segment associations for the received call-stack information, and designating the source of the received call-stack information for receipt of special content if the source is identified as part of a particular segment.

Referring to FIG. 2 in broad overview, illustrated is a call-stack visualization 200. Call stacks can be structured as data containing subroutine state information. A call stack snapshot is composed of stack frames for each thread of an application at a given moment. Each stack frame in the call stack corresponds to a call to a subroutine which has not yet terminated with a return. In some implementations, the application author links in an instrumentation library that captures a trace of the application's call stack at regular intervals. In some implementations, the operating system itself captures periodic call stack information for the application. In some implementations, the call-stack information is representative of a snapshot of an application's current operational status, e.g., which threads have called which functions and are waiting, at the time of the snapshot, for the functions to finish execution. The information in the representation may be normalized. In some implementations, the call-stack information is a set of thread identifiers, object identifiers, and method names. In some implementations, the call-stack information is represented or stored as an array or linked-list of object names and method names.

Referring to FIG. 3 in broad overview, illustrated is a flowchart depicting an implementation for a method of periodically capturing and transmitting call-stack information. In the method 300, a stack information gathering module at a user device 120 captures, at stage 310, call-stack information for an executing application and, at stage 320, generates and stores a local representation of the captured call-stack information. The module repeats the stage 310 capture and stage 320 storing at periodic intervals, indicated by arrow 330. After generating a representation of at least one call-stack, the module, at stage 340, batches together a set of one or more representations of captured call-stack information and, at stage 350, transmits the batched set of call-stack information to the back-end servers 130, via a network 110. The stack information gathering module may be a hardware circuit, e.g., an ASIC, implemented in the user device 120, or may be a software module provided by either the operating system of the user device 120 or by a software library linked into the application instance 124. In some implementations, software application authors are provided a software library to include in the application and an application instance 124 invokes the stack information gathering module using one or more library instructions.

Referring to FIG. 3 in more detail, the method 300 includes periodic capture of call-stack information (stage 310) and generation of a local representation of the captured call-stack information (stage 320).

At stage 310, a stack information gathering module at a user device 120 captures call-stack information. The call stack, as described in reference to FIG. 2, indicates the state of each thread for an application. In some implementations, a stack information gathering module at a user device 120 captures, at stage 310, call-stack information for an executing application by calling a debugging function. The result of the function is call-stack information, e.g., trace or tracedump output. In some implementations, call-stack information is captured by a call to an operating system instruction that outputs the state of an application's execution. In some implementations, call-stack information is captured by a call to a program execution environment (e.g., a debugger or a Perl interpreter) or a virtual machine (e.g., Java Virtual Machine) instruction that outputs the state of an application's execution. Call-stack generation instructions include, but are not limited to: "jstack" in Java; "caller" in Perl; "debug_backtrace" in PHP; "backtrace" in Linux; "android::Call Stack" in Android; "Environment.StackTrace" and "TraceEventCache.Callstack" in .NET; and "StackTrace" in C++, provided by the mscorlib.dll library.

At stage 320, the stack information gathering module processes the call-stack information and generates a representation of the captured call-stack information, which it then stores in memory local to the user device 120. The local representation of the call-stack information may be structured, in some implementations, as an array or linked-list of object names and method names. In some implementations, the representative structure includes hierarchical data. In some implementations, at stage 320, the call-stack gathering module filters out function calls that are not informative. In some implementations, when it is enough to know that a high-level function was called, lower-level functions called by the high-level function are removed by a filter. That is, if a call is to draw a button on the screen, and it is enough to know that the button is being drawn, then it isn't necessary to know exactly how the button gets drawn and the filter can omit the lower-level calls involved in drawing the button. In some implementations, the local representation is compressed.

The call-stack information capturing and storing stages 310 and 320 are repeated, as indicated by arrow 330. In some implementations, the stages are repeated at regular periodic intervals in the range of one iteration every tenth of a second (or less) to one iteration every sixty seconds (or more). In some implementations, the periodic interval is fixed. In some implementations, the periodic interval is set by the application author. In some implementations, the periodic interval is variable, e.g., at random interval lengths or at interval lengths that are routinely adjusted to avoid performance impact.

After one or more representations of call-stack information are generated and stored at stage 320, the stack information gathering module batches the information together (stage 340) and transmits the batched set of call-stack information to a back-end server 130 (stage 350). In some implementations, the number of iterative call-stack representations batched together at stage 340 is based on a predetermined number of iterations, e.g., every five iterations. In some implementations, the number of iterative call-stack representations batched together at stage 340 is based on a predetermined length of time, e.g., all of the information gathered every five minutes. In some implementations, the iterations 330 continue until processor demand drops below a threshold usage percentage. In some implementations, the iterations 330 continue until network bandwidth usage drops below a threshold level. In some implementations, the iterations 330 continue until network quality is above a threshold. In some implementations, the information is not transmitted over mobile network connection, such as a 3G or 4G network connection, and is held until a Wi-Fi network connection is available.

The call-stack information can be transmitted, at stage 350, using any appropriate network protocol, e.g., the Transmission Control Protocol (TCP), the Stream Control Transmission Protocol (SCTP), or the User Datagram Protocol (UDP). In some implementations, the call-stack information is transmitted using the file transfer protocol (FTP). In some implementations, the call-stack information is transmitted using a custom protocol layered over one of TCP, SCTP, or TCP.

Referring to FIG. 4 in broad overview, illustrated is a flowchart depicting an implementation for a method 400 of collecting and comparing call-stack information for a plurality of remote devices. A stack aggregation server 140 collects a plurality of successful traces from a plurality of "first" instances 124 of an application, each instance executing on a respective remote device 120 in a plurality of remote devices (stage 410). After collecting at least some successful traces in stage 410, the stack aggregation server 140 receives call-stack information from a "second" instance 124 of the application executing on a remote device 120 (stage 430). The stack aggregation server 140 determines a similarity between the call-stack information received from the second instance 124 of the application and the call-stack information in the plurality of successful traces received from the first application instances (stage 450). The stack aggregation server 140 then, responsive to an affirmative determination at stage 450 that the call-stack information received from the second instance 124 of the application is similar to the successful traces collected in stage 410, adds the remote user device 120 to a population of devices predicted as likely to execute the particular objective (stage 470).

Referring to FIG. 4 in more detail, the method 400 begins with a stack aggregation server 140 collecting a plurality of successful traces from a plurality of instances 124 of an application, each instance executing on a respective remote device 120 in a plurality of remote devices (stage 410). The collecting at stage 410 includes receiving, by the stack aggregation server 140 at stage 422, call-stack information from a first instance 124 of an application executing on a first remote device 120 (e.g., referring to FIG. 1, application instance $124_{(a)}$ executing on user device $120_{(a)}$) and receiving, at stage 424, an indicator that the first instance $124_{(a)}$ of the application has executed an objective. The stack aggregation server 140, responsive to the indicator, then aggregates the received call-stack information leading up to the executed objective and treats the aggregated information as a successful trace in stage 426. The collection of successful traces in stage 410 is ongoing, and may continue concurrent with, or subsequent to, receipt of stack-information for comparison to the successful traces.

At stage 422, the stack aggregation server 140 receives call-stack information from a first instance $124_{(a)}$ of an application executing on a first remote device $120_{(a)}$. The remote user device 120 submits the information for receipt by the server 140, e.g., as described in reference to FIG. 3. In some implementations, when the stack aggregation server 140 receives call-stack information, the server 140 stores the received information, e.g., in storage 134. In some implementations, the stack aggregation server 140 identifies a source for the received call-stack information, e.g., an identifier associated with the first application instance $124_{(a)}$ and/or the first remote device $120_{(a)}$. In some implementations, the stack aggregation server 140 aggregates the received information with information previously received from the same application instance $124_{(a)}$ and/or the same remote device $120_{(a)}$. In some implementations, the stack aggregation server 140 filters the received information, e.g., to filter out function calls that are not informative. In some implementations, when it is enough to know that a high-level function was called, lower-level functions called by the high-level function are removed by a filter. In some implementations, the filter dynamically identifies function calls that are consistent across all call-stack information received from all application instances, and removes the identified function call information. In some implementations, any call-stack information that is not useful for distinguishing between execution patterns may be filtered and removed. In some implementations, when the stack aggregation server 140 receives call-stack information from an application instance at stage 430, the server 140 also treats the received information as a receipt of information at stage 422.

At stage 424, the stack aggregation server 140 receives an indicator that the first instance $124_{(a)}$ of the application has executed the objective. In some implementations, the indicator is an express indicator from the application instance 124. In some implementations, the indicator is identified through analysis of the call-stack information received at stage 422. In some implementations, the objective is execution of a particular function call (or set of function calls); in some such implementations, the indicator that the particular objective has been executed is that the particular function call has (or set of function calls have) been executed, which is identified through the presence of the function(s) in the received call-stack information. In some implementations, the indicator is received from a back-end server 130. In some implementations, the objective is achieved by interaction between the user device 120 and a back-end server 130, where the server 130 reports (to the stack aggregation server 140) the indicator of successful completion of the objective. In some implementations, the indicator is that the received call-stack information is for an execution pattern consistent with successful completion of the objective. In some such implementations, the stack aggregation server 140 uses a clustering algorithm to determine if the received call-stack information is similar to call-stack information for application instances that have completed the objective, and, if so, indicates that the application instance has also completed the objective. In some such implementations, the clustering algorithm generates a confidence score and the stack aggregation server 140 uses a confidence score above a predetermined threshold as an indicator that the application instance has executed the objective. At stage 424, the stack aggregation server 140 determines that the first instance $124_{(a)}$ of the application has executed the objective, such that the call-stack information received at stage 422 is call-stack information that is consistent with execution patterns likely to include execution of the objective.

At stage 426, the stack aggregation server 140, responsive to the indicator, aggregates the received call-stack information leading up to the executed objective and treats the aggregated information as a successful trace. In some implementations, the aggregated call-stack information and/or the indicator are stored, e.g., in storage 134. The plurality of successful traces collected at stage 410 includes the aggregated call-stack information from stage 426 for each of a plurality of application instances 124.

At stage 430, after collecting at least some successful traces in stage 410, the stack aggregation server 140 receives call-stack information from an instance 124 of the application executing on a remote device 120 ((e.g., application instance $124_{(b)}$ executing on user device $120_{(b)}$, as shown in FIG. 1). The application instance in stages 430, 450, and 470, are described as a "second instance" of the application in comparison to the various "first instances" of the application used in the plurality of instances at stage 410. In some implementations, a "second instance" of the application may already have participated as a "first instance," while in other implementations, the "second instance" may specifically be precluded from having participated as a "first instance." The stack aggregation server 140 receives the call-stack information from a remote user device 120 via the network 110. The remote user device 120 submits the information for receipt by the server 140, e.g., as described in reference to FIG. 3. In some implementations, the stack aggregation server 140 filters the received information, e.g., to filter out function calls that are not informative. In some implementations, the filter removes function calls that are consistent across all call-stack information received from all instances of the application. In some implementations, any call-stack information that is not useful for distinguishing between execution patterns may be filtered and removed.

At stage 450, the stack aggregation server 140 determines a similarity between the call-stack information received at stage 430 from the second instance $124_{(b)}$ of the application and the call-stack information in the plurality of successful traces collected at stage 410. In some implementations, similarities are identified by applying a clustering algorithm to the received call-stack information. A clustering algorithm, such as a hierarchical clustering algorithm, identifies clusters of received call-stack information that have a high degree of similarity. One or more such clusters are associated with successful traces, and if the call-stack information received at stage 430 from the second instance $124_{(b)}$ of the application is grouped with one a cluster associated with successful traces, then the call-stack information received at stage 430 is for an application instance that is likely to be part of a successful trace. In some implementations, the degree of similarity is measured by a similarity score and, at stage 450, the similarity score must be above a threshold value in order for the call-stack information received at stage 430 to be considered sufficiently similar to a particular cluster of call-stack information. In some implementations, the stack aggregation server 140 determines that the call-stack information excludes the user device from the segment of user devices likely to execute the objective. That is, in some instances, there is no similarity between the call-stack information received and the call-stack information in the plurality of successful traces collected at stage 410. In some implementations, this dissimilarity is recorded as an alternative segment.

At stage 470, responsive to an affirmative determination at stage 450 that the call-stack information received from the second instance 124 of the application is similar to the successful traces collected in stage 410, the stack aggregation server 140 adds the remote user device 120 to a population of devices predicted as likely to execute the particular objective (stage 470). In some implementations, a record associated with an identifier for the user device is updated, e.g., in storage 134, with a tag or identifier indicating that the user device hosts an application instance that is in the particular segment likely to execute the particular objective.

Referring to FIG. 5 in broad overview, illustrated is a flowchart depicting an implementation for a method 500 of responding to identification of a segment association for received call-stack information. A stack aggregation server 140 receives call-stack information from an instance 124 of the application executing on a remote user device 120, as described in reference to FIG. 4. The stack aggregation server 140 identifies, at stage 530 of the method 500, a segment association for the remote device 120 based on the call-stack information received from the application executing on the remote device. The stack aggregation server 140 determines, at stage 540, whether there is special content for the identified segment, and, if so, designates the remote device, at stage 550, for receipt of the special content. The stack aggregation server 140 stores, at stage 560, the received call-stack information and the identified segment association in a knowledge base, e.g., stored in data storage 134.

Referring to FIG. 5 in more detail, the stack aggregation server 140 identifies, at stage 530 of the method 500, a segment association for the remote device 120 based on the call-stack information received from the application executing on the remote device. The call-stack information is received by the stack aggregation server 140 from the remote user device 120 in the manner previously described. That is, the user device 120 captures the call-stack information and transmits the information via the network 110 to the stack aggregation server 140, which receives the information. The stack aggregation server 140 identifies a segment affiliation for the user device 120 based on the received call stack information, as described in reference to FIG. 4. In some implementations, the stack aggregation server 140 uses a clustering algorithm to compare the received call-stack information to previously received information, and to identify a sub-set of the previously received information that is most similar to the newly received information. The identified sub-set corresponds to a population segment. The stack aggregation server 140 identifies, at stage 530, the segment association for the user device based on these comparisons.

At stage 540, the stack aggregation server 140 then determines whether there is special content for the identified segment. In some implementations, if the particular segment identified is likely to execute a particular objective, there may be content designated for the segment where the content is meant to assist in execution of the particular objective. In some implementations, the content is designated by an author or vendor of the specific software application. In some implementations, the content is designated by (or at the request of) a third-party. In some implementations, the determination of whether there is special content is disjoint from receipt of the call-stack information. That is, the stack aggregation server 140 may receive the call-stack information during a first period of time and then determine, during a later second period of time, that there is special content for the identified segment.

At stage 550, if the stack aggregation server 140 determines at stage 540 that there is special content for delivery to the segment identified at stage 530, then the server 140 designates the remote device, at stage 550, for receipt of the special content. In some implementations, the stack aggregation server 140 causes a content server 160 to transmit the content to the user device 120. In some implementations, the stack aggregation server 140 sets a flag or records an indicator used by a content server 160 for identifying designated recipients for specific content. In some such implementations, the stack aggregation server 140 updates a knowledge base with a record associated with the user device 120 hosting the application instance 124. The update indicates, to a content server 160, that the user device 120 should receive the special content. The content server 160, responsive to the record, then transmits the content to the user device 120, via the network 110.

At stage 560, the stack aggregation server 140 stores the received call-stack information, and the identified segment association, in a knowledge base, e.g., at data storage 134. In some implementations, this data is stored in the same manner described in reference to FIG. 4.

FIG. 6 is a block diagram of a computing system 910 suitable for use in implementing the computerized components described herein. In broad overview, the computing system 910 includes at least one processor 950 for performing actions in accordance with instructions, and one or more memory devices 970 and/or 975 for storing instructions and data. The illustrated computing system 910 includes one or more processors 950 in communication, via a bus 915, with memory 970 and with at least one network interface controller 920 with a network interface 922 for connecting to external network devices 924, e.g., participating in a network (such as the networks 110, 160, and 180 shown in FIG. 1). The one or more processors 950 are also in communication, via the bus 915, with any I/O devices at one or more I/O interfaces 930, and any other devices 980. The processor 950 illustrated incorporates, or is directly connected to, cache memory 975. Generally, a processor will execute instructions received from memory.

In more detail, the processor 950 may be any logic circuitry that processes instructions, e.g., instructions fetched from the memory 970 or cache 975. In many embodiments, the processor 950 is a microprocessor unit or special purpose processor. The computing device 910 may be based on any processor, or set of processors, capable of operating as described herein. The processor 950 may be a single core or multi-core processor. The processor 950 may be multiple processors.

The memory 970 may be any device suitable for storing computer readable data. The memory 970 may be a device with fixed storage or a device for reading removable storage media. The memory 970 may include any form of non-volatile memory, media and memory devices, semiconductor memory devices (e.g., EPROM, EEPROM, SDRAM, and Flash memory devices), magnetic disks, magneto optical disks, and/or optical discs (e.g., CD ROM, DVD-ROM, and Blu-Ray® discs). A computing system 910 may have any number of memory devices 970.

The cache memory 975 is generally a form of computer memory placed in close proximity to the processor 950, e.g., for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interface 922. The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. In some implementations, the network interface 922 is a connection point for a physical network link, e.g., an RJ 45 connector. In some implementations, the network interface controller 920 supports wireless network connections and an interface port 922 is a wireless receiver/transmitter. Generally, a computing device 910 exchanges data with other computing devices 924 via physical or wireless links to a network interface 922. In some implementations, the network interface controller 920 implements a network protocol such as Ethernet.

The other computing devices 924 are connected to the computing device 910 via a network interface 922 (sometimes referred to as a "port" or "physical port," so as to distinguish from a protocol-level port). The other computing device 924 may be a peer computing device, a network device, or any other computing device with network functionality. In some implementations, the other computing device 924 is a network device such as a hub, a bridge, a switch, or a router, such that the other computing device 924 connects the computing device 910 to a data network such as the Internet.

In some uses, the I/O interface 930 supports an input device and/or an output device (not shown). In some uses, the input device and the output device are integrated into the same hardware, e.g., as in a touch screen. In some uses, such as in a server context, there is no I/O interface 930 or the I/O interface 930 is not used. In some uses, additional other components 980 are in communication with the computer system 910, e.g., external devices connected via a universal serial bus (USB).

The other devices 980 may include an I/O interface 930, external serial device ports, and any additional co-processors. In some implementations, a computing system 910 includes an interface (e.g., a universal serial bus (USB) interface) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 910, e.g., a touch screen on a tablet device. In some implementations, a computing device 910 includes an additional device 980 such as a co-processor, e.g., a math co-processor that can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of processing traces, comprising:
    capturing, by one or more processors, first call-stack information for an executing application;
    generating, by the one or more processors, a first local representation of the first captured call stack information;
    batching, by the one or more processors, the first local representation of the first captured call stack information with one or more second local representations of second captured call stack information to generate batched captured call stack information, each of the first captured call stack information and second captured call stack information indicating successful execution of a predefined set of one or more function calls, and the batched captured call stack information including a plurality of indications of successful execution of the predefined set of one or more function calls;
    transmitting, by the one or more processors to a remote device, the batched captured call stack information according to a stack information transmission policy.

2. The method of claim 1, wherein the stack information transmission policy specifies batching and transmitting a predetermined total number of local representations of captured call stack information.

3. The method of claim 1, wherein the stack information transmission policy specifies batching and transmitting the local representations of captured call stack information based on a predetermined length of time.

4. The method of claim 1, wherein the stack information transmission policy specifies batching and transmitting the local representations of captured call stack information when processor demand drops below a threshold level.

5. The method of claim 1, wherein the stack information transmission policy specifies batching and transmitting the local representations of captured call stack information when network bandwidth usage drops below a threshold level.

6. The method of claim 1, wherein the predefined set of one or more function calls are executed as part of a purchase transaction implemented using the application.

7. The method of claim 1, wherein the stack information transmission policy specifies batching and transmitting the local representations of captured call stack information over a Wi-Fi connection.

8. The method of claim 1, further comprising:
    determining that both the first captured call stack information and the second captured call stack information include at least one of the one or more indications of successful execution of the predefined set of function calls,
    wherein batching the first local representation with the second local representation is performed responsive to determining that both the first captured call stack information and the second captured call stack information include the at least one of the one or more indications of successful execution of the predefined set of function calls.

9. A method of processing traces, comprising:
    capturing, by one or more processors, first call-stack information for an executing application, the first call stack information comprising one or more stack frames respectively corresponding to functions called by the executing application, the first call stack information including one or more indications of successful execution of a predefined set of one or more function calls;
    generating, by the one or more processors, a local representation of the captured call stack information comprising hierarchical data using a filtering policy, the filtering policy specifying omission of one or more low level calls; and
    transmitting, by the one or more processors to a remote device, the local representation of the captured call stack information including the one or more indications of successful execution of the predefined set of one or more function calls,
    wherein the filtering policy specifies that the one or more low level function calls are to be omitted when a high level function call that calls the one or more low level calls is included in the local representation.

10. The method of claim 9, wherein the captured call stack information comprises an array or linked-list of object names and method names including a name of the high level function call.

11. The method of claim 9, wherein the predefined set of one or more function calls are executed as part of a purchase transaction implemented using the application.

12. The method of claim 9, wherein generating the local representation of the captured call stack information comprises compressing the captured call stack information.

13. The method of claim 9, wherein capturing the first call-stack information is performed using an instrumentation library referenced by the executing application.

14. The method of claim 9, wherein capturing the first call-stack information is performed by an operating system executed by the one or more processors.

15. A method of processing traces, comprising:
    capturing, by one or more processors, first call-stack information for an executing application;
    generating, by the one or more processors, a first local representation of the first captured call stack information using a filtering policy, the filtering policy specifying omission of one or more low level calls;
    batching, by the one or more processors, the first local representation of the first captured call stack information with one or more second local representations of second captured call stack information to generate batched captured call stack information, each of the first captured call stack information and second captured call stack information indicating successful execution of a predefined set of one or more function calls, and the batched captured call stack information including a plurality of indications of successful execution of the predefined set of one or more function calls;

transmitting, by the one or more processors to a remote device, the batched captured call stack information according to a stack information transmission policy.

16. The method of claim 15, wherein the stack information transmission policy specifies batching and transmitting a predetermined total number of local representations of captured call stack information.

17. The method of claim 15, wherein the stack information transmission policy specifies batching and transmitting the local representations of captured call stack information based on a predetermined length of time.

18. The method of claim 15, wherein the predefined set of one or more function calls are executed as part of a purchase transaction implemented using the application.

19. The method of claim 15, further comprising:

wherein the filtering policy specifies that the one or more low level function calls are to be omitted when a high level function call that calls the one or more low level function calls is included in the local representation.

\* \* \* \* \*